(12) United States Patent
Da Costa et al.

(10) Patent No.: US 12,307,362 B2
(45) Date of Patent: May 20, 2025

(54) BATCH PROCESSING IN A MACHINE LEARNING COMPUTER

(71) Applicant: Graphcore Limited, Bristol (GB)

(72) Inventors: Godfrey Da Costa, Bristol (GB); Carlo Luschi, Oxford (GB)

(73) Assignee: GRAPHCORE LIMITED, Bristol (GB)

( * ) Notice: Subject to any disclaimer, the term of this patent is extended or adjusted under 35 U.S.C. 154(b) by 962 days.

(21) Appl. No.: 17/363,379

(22) Filed: Jun. 30, 2021

(65) Prior Publication Data
US 2022/0138564 A1    May 5, 2022

(30) Foreign Application Priority Data
Oct. 30, 2020    (GB) .................................... 2017262

(51) Int. Cl.
*G06N 3/08*    (2023.01)
*G06N 3/04*    (2023.01)

(52) U.S. Cl.
CPC ................. *G06N 3/08* (2013.01); *G06N 3/04* (2013.01)

(58) Field of Classification Search
CPC ........... G06N 3/08; G06N 3/04; G06N 3/063; G06N 3/084
See application file for complete search history.

(56) References Cited

U.S. PATENT DOCUMENTS

| | | | |
|---|---|---|---|
| 2020/0250515 A1* | 8/2020 | Rifkin | G06N 3/084 |
| 2021/0174265 A1* | 6/2021 | Baker | G06N 3/048 |
| 2021/0248510 A1* | 8/2021 | Morimura | G06N 20/00 |
| 2021/0294638 A1* | 9/2021 | Edwards | G06F 9/54 |
| 2021/0303991 A1* | 9/2021 | Wagner | G06N 3/045 |
| 2022/0101084 A1* | 3/2022 | Burr | G06N 3/084 |

OTHER PUBLICATIONS

"NVIDIA Tesla P40 GPU Accelerator" (2017), pp. 1-2. (Year: 2017).*
Sharma, Sagar, et al. "Activation functions in neural networks." Towards Data Sci 6.12 (2017), pp. 310-316 (Year: 2017).*

(Continued)

*Primary Examiner* — George Giroux
*Assistant Examiner* — Michael C. Lee
(74) *Attorney, Agent, or Firm* — HAYNES AND BOONE, LLP (57) ABSTRACT

A method of processing batches of data in a computer comprising a plurality of pipelined stages each providing one or more layers of a machine learning model. The method comprises: processing a first batch of data in the pipeline processing stages, each layer of the model using an activation function and weights for that layer to generate an output activation, wherein an output layer generates an output of the model. The method further comprises, for each layer: computing an estimated gradient of a loss function; generating updated weights by processing the estimated gradient with respect to the weights for the first batch using a learning rate for the model; and storing the updated weights for processing on the next batch of data. Updated weights are generated using a modulation factor based on the number of processing stages between that layer and the output layer.

18 Claims, 8 Drawing Sheets

(56) References Cited

OTHER PUBLICATIONS

Guan, Lei, et al. "XPipe: Efficient pipeline model parallelism for multi-GPU DNN training." arXiv preprint arXiv:1911.04610 (2019), pp. 1-9. (Year: 2019).*

Chen, Chi-Chung, et al. "Efficient and robust parallel dnn training through model parallelism on multi-gpu platform." arXiv preprint arXiv:1809.02839v4 (Oct. 28, 2019), pp. 1-13 (Year: 2019).*

Definition of "variance" in Merriam Webster online dictionary, available at https://web.archive.org/web/20201027030216/https://www.merriam-webster.com/dictionary/variance (archived on Oct. 27, 2020); (Year: 2020).*

Huang et al., "GPipe: Easy Scaling with Micro-Batch Pipeline Parallelism". arXiv preprint arXiv:1811.06965' [cs.CV]. Jul. 25, 2019.

Harlap et al., "PipeDream: Fast and Efficient Pipeline Parallel DNN Training". arXiv preprint arXiv:1806.03377 [cs.DC]. Jun. 8, 2018.

Yang et al., "PipeMare: Asynchronous Pipeline Parallel DNN Training". arXiv preprint arXiv:1910.05124 [cs.DC]. Feb. 9, 2020.

Goodfellow et al., "Optimizing for Training Deep Models". MIT press, Nov. 1, 2016. https://www.deeplearningbook.org/contents/optimization.html.

* cited by examiner

| TIME | t0 | t1 | t2 | t3 | t4 | t5 | t6 | t7 | t8 | t9 | t10 | t11 | t12 | t13 | t14 | t15 | t16 | t17 |
|---|---|---|---|---|---|---|---|---|---|---|---|---|---|---|---|---|---|---|
| 1 | F1 | F1 |   |   |   |   |   | B1 | U | F2 |   |   |   |   |   | B2 |   | U |
| 2 |   | F1 | F1 |   |   |   | B1 |   | U |   | F2 |   |   |   | B2 |   |   | U |
| 3 |   |   |   | F1 |   | B1 |   |   | U |   |   | F2 |   | B2 |   |   |   | U |
| 4 |   |   |   | F1 | B1 |   |   |   | U |   |   |   | F2 | B2 |   |   |   | U |

Figure 1A
-- PRIOR ART --

| TIME | t0 | t1 | t2 | t3 | t4 | t5 | t6 | t7 | t8 | t9 | t10 | t11 | t12 | t13 | t14 |
|---|---|---|---|---|---|---|---|---|---|---|---|---|---|---|---|
| 1 | F1(1) | F1(2) | F1(3) | F1(4) |   |   |   |   |   | B1(4) | B1(3) | B1(2) | B1(1) |   | U |
| 2 |   | F1(1) | F1(2) | F1(3) | F1(4) |   |   |   | B1(4) | B1(3) | B1(2) | B1(1) |   |   | U |
| 3 |   |   | F1(1) | F1(2) | F1(3) | F1(4) |   | B1(4) | B1(3) | B1(2) | B1(1) |   |   |   | U |
| 4 |   |   |   | F1(1) | F1(2) | F1(3) | F1(4) | B1(4) | B1(3) | B1(2) | B1(1) |   |   |   | U |

BUBBLE

Figure 1B
-- PRIOR ART --

| TIME → | t0 | t1 | t2 | t3 | t4 | t5 | t6 | t7 | t8 | t9 | t10 | t11 | t12 | t13 | t14 | t15 | t16 | t17 | t18 |
|---|---|---|---|---|---|---|---|---|---|---|---|---|---|---|---|---|---|---|---|
| 1 | F1 | F2 | F3 | F4 | F5 | F6 | F7 | F8 | F9 B1 W1 | F10 B2 W2 | F11 B3 W3 | B4 W4 | B5 W5 | B6 W6 | B7 W7 | B8 W8 | B9 W9 | B10 W10 | B11 W11 |
| 2 | | F1 | F2 | F3 | F4 | F5 | F6 | F7 B1 W1 | F8 B2 W2 | F9 B3 W3 | F10 B4 W4 | F11 B5 W5 | B6 W6 | B7 W7 | B8 W8 | B9 W9 | B10 W10 | B11 W11 | |
| 3 | | | F1 | F2 | F3 | F4 | F5 B1 W1 | F6 B2 W2 | F7 B3 W3 | F8 B4 W4 | F9 B5 W5 | F10 B6 W6 | F11 B7 W7 | B8 W8 | B9 W9 | B10 W10 | B11 W11 | | |
| 4 | | | | F1 | F2 | F3 B1 W1 | F4 B2 W2 | F5 B3 W3 | F6 B4 W4 | F7 B5 W5 | F8 B6 W6 | F9 B7 W7 | F10 B8 W8 | F11 B9 W9 | B10 W10 | B11 W11 | | | |
| 5 | | | | | F1 B1 W1 | F2 B2 W2 | F3 B3 W3 | F4 B4 W4 | F5 B5 W5 | F6 B6 W6 | F7 B7 W7 | F8 B8 W8 | F9 B9 W9 | F10 B10 W10 | F11 B11 W11 | | | | |

-- PRIOR ART --  Figure 2

| TIME → | t0 | t1 | t2 | t3 | t4 | t5 | t6 | t7 | t8 | t9 | t10 | t11 | t12 | t13 | t14 | t15 | t16 | t17 | t18 |
|---|---|---|---|---|---|---|---|---|---|---|---|---|---|---|---|---|---|---|---|
| 1 | F1 | F2 | F3 | F4 | F5 | F6 | F7 | F8 | F9 B1 W1 U(m1) | F10 B2 W2 U(m1) | F11 B3 W3 U(m1) | B4 W4 U(m1) | B5 W5 U(m1) | B6 W6 U(m1) | B7 W7 U(m1) | B8 W8 U(m1) | B9 W9 U(m1) | B10 W10 U(m1) | B11 W11 U(m1) |
| 2 | | F1 | F2 | F3 | F4 | F5 | F6 | F7 B1 W1 U(m2) | F8 B2 W2 U(m2) | F9 B3 W3 U(m2) | F10 B4 W4 U(m2) | F11 B5 W5 U(m2) | B6 W6 U(m2) | B7 W7 U(m2) | B8 W8 U(m2) | B9 W9 U(m2) | B10 W10 U(m2) | B11 W11 U(m2) | |
| 3 | | | F1 | F2 | F3 | F4 | F5 B1 W1 U(m3) | F6 B2 W2 U(m3) | F7 B3 W3 U(m3) | F8 B4 W4 U(m3) | F9 B5 W5 U(m3) | F10 B6 W6 U(m3) | F11 B7 W7 U(m3) | B8 W8 U(m3) | B9 W9 U(m3) | B10 W10 U(m3) | B11 W11 U(m3) | | |
| 4 | | | | F1 | F2 | F3 B1 W1 U(m4) | F4 B2 W2 U(m4) | F5 B3 W3 U(m4) | F6 B4 W4 U(m4) | F7 B5 W5 U(m4) | F8 B6 W6 U(m4) | F9 B7 W7 U(m4) | F10 B8 W8 U(m4) | F11 B9 W9 U(m4) | B10 W10 U(m4) | B11 W11 U(m4) | | | |
| 5 | | | | | F1 B1 W1 U(m5) | F2 B2 W2 U(m5) | F3 B3 W3 U(m5) | F4 B4 W4 U(m5) | F5 B5 W5 U(m5) | F6 B6 W6 U(m5) | F7 B7 W7 U(m5) | F8 B8 W8 U(m5) | F9 B9 W9 U(m5) | F10 B10 W10 U(m5) | F11 B11 W11 U(m5) | | | | |

BATCH PROCESSING IN A MACHINE LEARNING COMPUTER

CROSS-REFERENCE TO RELATED APPLICATIONS

The present application claims priority to United Kingdom Patent Application No. GB2017262.3, filed Oct. 30, 2020, the disclosure of which is hereby incorporated herein by reference in its entirety.

FIELD

The present disclosure relates to batch processing in a machine learning computer, particularly but not exclusively to the training of a machine learning computer

BACKGROUND

In a typical supervised method of training a neural network model, a training dataset is used, each training example of the training data comprising an input and a target output. For example, an input may be an array of values and the target output may be a single value. In this example, the goal of the model may be to learn to predict outputs for a given set of input arrays. A neural network model may comprise multiple layers, each layer typically comprising a linear operation and a nonlinearity. Each layer operates in a forwards pass to receive a set of inputs and generate a set of output values, which serves as input for a next layer. An output value is typically generated by an activation function at that layer, which may compute an output value using model parameters (or weights) and the set of inputs to that layer. The resulting values of a layer's activation function may be referred to herein as activations. For example, the parameters of a given layer of the neural network may be multiplied by the input values to obtain a weighted sum, and a nonlinear activation function such as a sigmoid or a rectified linear unit (ReLU) may be applied to the weighted sum to generate outputs of that layer, which serve as inputs to the next layer. The output value of the final layer is typically compared with the target output of the training set using a predefined loss function, and the weights of the model are updated in such a way as to minimise this loss function.

Weights of a neural network model may be updated based on values computed in a backward pass through the model layers in a process known as 'backpropagation'. Updates to the weights are calculated at each layer to adjust the weights such that the loss function is minimised. Updates may be applied according to a gradient descent scheme. In an example gradient descent update scheme, an updated weight is calculated by adding to the current weight a term proportional to the negative gradient of the loss function with respect to the weight. The factor applied to the negative gradient may be referred to as the 'learning rate' as it affects the magnitude of the weight update at each step, and thus the speed at which the network learns. The learning rate value is typically set at the start of training, and may be adjusted over the course of training according to a predefined schedule to ensure convergence.

In stochastic gradient descent, the training data set is arranged in randomised subsets of a predetermined size, referred to as mini-batches. A loss function may be defined for a mini-batch as an average of the loss function calculated for each training example in the mini-batch. With backpropagation, the gradient of the mini-batch loss function with respect to the output of a given layer is used to derive the gradient of the mini-batch loss function with respect to the weights, and the gradient of the mini-batch loss function with respect to the input, which is then backpropagated to the previous layer. The gradient of the mini-batch loss function with respect to the weights is then used to update the weights according to an update rule to adjust the weights in the direction of the negative gradient of the mini-batch loss function.

Stochastic gradient descent is more computationally efficient as it requires fewer gradient calculations per update than the alternative of batch gradient descent, which calculates the gradient of a loss function for the entire training set for each update. Stochastic gradient descent also requires less memory at any given time to calculate the gradient over a mini-batch rather than the full training set. Use of stochastic gradient descent with mini-batch also allows for faster training by processing mini-batches on multiple devices in parallel and/or in a pipeline.

Machine learning programs may be distributed among multiple processing devices to improve the speed or efficiency of processing. Neural networks may be configured using multiple computing devices (which may also be referred to herein as processing nodes), where each device holds a copy of some or all of the parameters of the network. In some configurations, the network may be divided by layers, such that each processing node is assigned to process part or all of one or more layers of the network in a pipelined fashion.

Figure 1A:
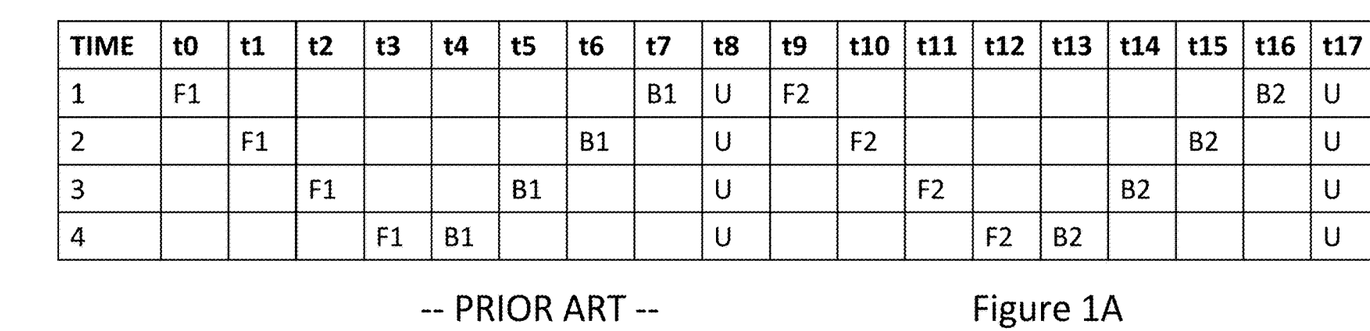
FIG. 1A is a block diagram of model training process on multiple nodes using synchronous updates.

An example of a training configuration is shown in FIG. 1A. In this example, the training dataset is divided into mini-batches, with data of each mini-batch processed at different stages of a pipeline. Data from a minibatch is processed at a different pipeline stage at each timestep. Note that, in this example, it is assumed that each pipeline stage corresponds to a different processing node. However, in general, nodes may be reused to process multiple pipeline stages. In this example, for the sake of clarity, it is assumed that each pipeline stage corresponds to a single layer of the network. However, a pipeline stage may generally refer to any number of layers, or indeed a fraction of a single layer.

In the example configuration of FIG. 1A, each node computes the outputs of its corresponding layer for mini-batch 1 in a forward pass, where these computations are denoted by 'F1'. When mini-batch 1 has been processed by calculating the outputs at each layer in a forward pass, a loss function may be calculated comparing the outputs of the final layer to the set of target outputs for that mini-batch. The mini-batch may be processed again in a backward pass, starting by computing the gradient of the loss function, denoted by 'B', with respect to the input of the final layer of the network and propagating backwards to the output of the input layer, computing at each layer the gradient of the loss function with respect to the input B and the gradient of the loss function with respect to the weights W. The weights of the network are then updated based on the gradient values with respect to the weights calculated during the backward pass and the applied learning rate.

Figure 1B:
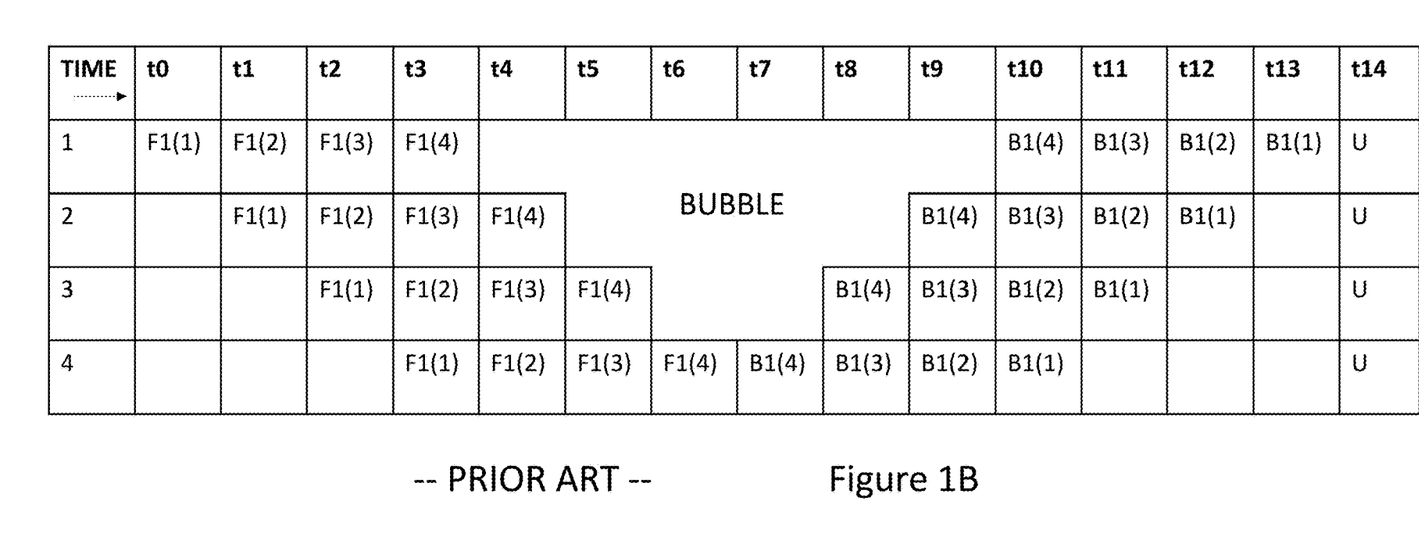
FIG. 1B is a block diagram of a pipelined training process for a single mini-batch of data with synchronous updates.

An example implementation of stochastic gradient descent using mini-batches applies the weight updates in a 'synchronous' manner. As shown in FIG. 1A, the weight updates are applied at all pipeline stages in an update step, denoted by 'U', only once the full forward and backward passes have completed. This leads to under-utilisation of the processing nodes as the majority of nodes are idle at any given timestep. A modification of this is shown in FIG. 1B. In FIG. 1B, data for each mini-batch is divided into micro-batches, which are processed in a pipelined manner on different nodes. The pipelined processing of a first mini-batch, now subdivided into a set of four micro-batches, is shown. Forward processing of micro-batches of a first mini-batch 1, denoted by F1(1), F1(2), etc. can be carried out by different nodes in the same timestep. For example, at timestep $t_3$, all four nodes are computing outputs for a different micro-batch. Backwards computations of gradients with respect to the input B1(1), B1(2), etc. and the gradients with respect to the weights W1(1), W1(2), etc. for the first mini-batch begin once the forward pass is complete for the full mini-batch. However, while this allows some overlapping use of nodes, this still leads to significant inefficiency in processing node utilisation, with the 'bubble' showing time steps in which one or more nodes are idle.

Figure 2:
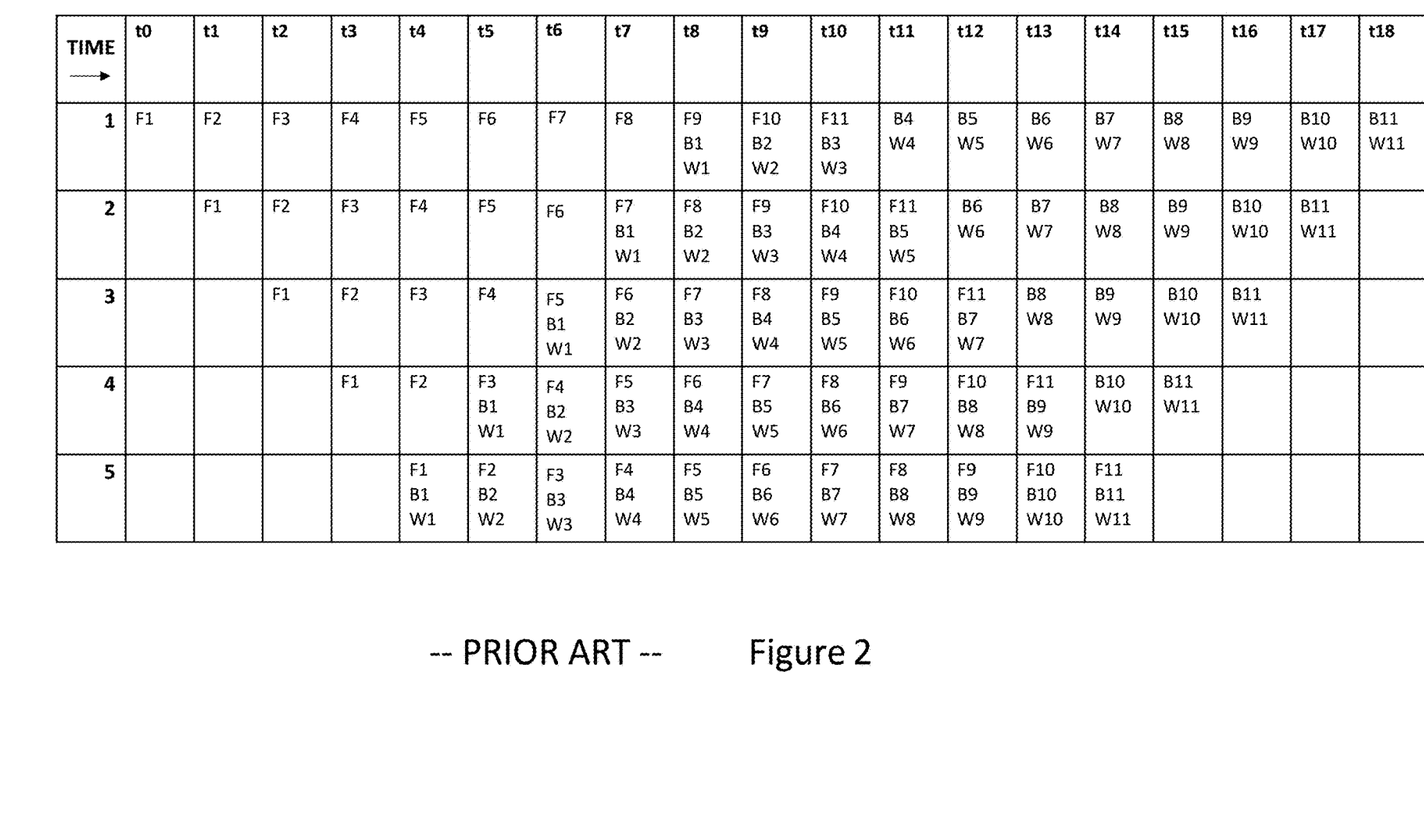
FIG. 2 is a block diagram showing asynchronous pipelined processing of multiple mini-batches in training a machine learning model.

To address this, a possible alternative was developed, in which updates are applied when the gradients are calculated at each stage in an asynchronous scheme. An example of an asynchronous pipeline-parallel training strategy is outlined in Yang, Bowen et al., "PipeMare: Asynchronous Pipeline Parallel DNN Training", arXiv preprint arXiv:1910.05124, 2019. This means that simultaneous processing of multiple mini-batches can be carried out at the different processing nodes, maximising processing node usage. An example of asynchronous update is shown in FIG. 2. The first mini-batch is denoted in FIG. 2 by '1', with 'F1' referring to the computed output for the first mini-batch at the given node by forward processing applied to the input and 'B1' and 'W1' referring to calculation of the gradients in a backward pass for the first mini-batch data. The gradient of the loss function is calculated by applying the chain rule to the gradient of the loss function to be calculated. According to the chain rule, the gradient of the loss function with respect to the input of the given layer can be computed using a product of the gradient of the loss function with respect to the output and the weights, and the gradient of the loss function with respect to the weights can be computed using a product of the gradient of the loss function with respect to the output of the given layer and the input, which is known. Thus, in the backward pass two computations are carried out as shown in each node of FIG. 2, where B1 denotes the gradient of the loss function with respect to the input of that layer and W1 denotes the gradient of the loss function with respect to the weights. The gradient with respect to the inputs B1 can then be passed back to a previous layer to compute the gradient with respect to the weights and the gradient with respect to the inputs of that previous layer.

Note that processing nodes are preferably configured to process the same layer of the neural network in both forward and backward directions. In FIG. 2, for example, each of the layers 1 to 5, corresponding to pipeline stages 1 to 5, is associated with a corresponding one of nodes 1 to 5. Processing at each stage of FIG. 2 may be referred to by layers 1, 2, etc. or nodes 1,2, etc. where this example has one-to-one correspondence between pipeline stages, layers and nodes. Note, however, that pipeline stages may in general comprise any number of layers, or a portion of a layer of a model, and the same node may be re-used to process multiple pipeline stages. Each processing node may comprise a single chip, or a multi-chip network.

Since, in this scheme, nodes do not have to wait for processing to complete for one mini-batch on all nodes before applying updates, nodes associated with each pipeline stage can continuously process new mini-batches. For example, the first mini-batch is input to the network at t0 and reaches the final pipeline stage at timestep t4 at node 5 and its output F1, and gradients W1 and B1 are calculated. The loss function may also be calculated at the end of the forward pass to track the progress of training, but this is not always necessary. Weight updates are calculated based on W1 and the model learning rate. At timestep t1, a second mini-batch has begun to be processed at pipeline stage 1, generating forward processing outputs F2. At time t2 a third mini-batch has begun to be processed, generating forward processing outputs F3. Note that F1, F2, F3 etc. are the forward processing outputs for the corresponding mini-batch at a particular stage. They may be different for each node for the same batch. At time t6, the backwards processing output B2 for mini-batch 2 is being computed at stage 4, and the forwards pass F4 is being computed for mini-batch 4. Note that the forward processing of batch 4 is using the weights which were updated based on the gradient calculation W1 for batch 1. At each timestep from t1 onwards, new mini-batches are input to the first stage of the pipeline and are processed at respective stages without waiting for a weight update for the first mini-batch to be computed and applied at every stage as in the synchronous case (see FIG. 1A). Note that while FIG. 2 shows only 11 mini-batches being processed, in practice mini-batches may be processed in a continuous manner going through the whole data of the entire training dataset a predetermined number of times, with at least some nodes processing data in both directions (forwards and backwards) from timestep t4 onwards.

Asynchronous updates allow for a high degree of parallel processing and node utilisation. However, as discussed in Yang, Bowen et al. (referenced above), asynchronous updates may lead to a problem of delay. Referring again to FIG. 2, at each node, outputs are calculated for a given mini-batch at a given timestep using the most recently updated weights at that node. For the final stage of the pipeline, processed by node 5, the output values for mini-batch 4 (F4), for example, are calculated at timestep t7 using weights updated at the previous timestep, t6, based on mini-batch 3, and the gradient for mini-batch 4 is computed using the same set of weights. However, at stage 4, the outputs of the fourth mini-batch (F4) are computed at timestep t6 using a set of weights updated based on mini-batch 1. The weight update is only applied at the fourth stage for mini-batch 4 at timestep t8. The gradient W4 is computed at stage 4 for a backpropagated gradient information which depends on weights that are 2 timesteps behind the current step.

Such delays may have the effect of slowing convergence of the parameters to an optimal set of weights due to the use of out of date weight updates at different layers of the network. The above referenced paper authored by Yang, Bowen et al. addresses this issue by bounding the learning rate coefficient applied to the update.

SUMMARY

According to one aspect of the present disclosure, there is provided a method of processing batches of data in a computer comprising a plurality of pipelined processing stages each providing one or more layers of a machine learning model, the method comprising: processing a first batch of data in the pipeline processing stages in a forward pass, each layer using an activation function and weights for that layer to generate an output activation, wherein the output activation provides an input for a next layer of the model, and wherein an output layer generates an output of the model; comparing the output with a target value in accordance with a loss function to provide an estimate of a gradient; processing the estimate of the gradient in a backwards pass of the model, each layer computing an estimate of the gradient for that layer with respect to the weights for that layer; generating in each layer updated weights resulting from processing the estimate of the gradient with respect to the weights for the first batch at that layer in the backwards pass, using a learning rate for the model; and storing the updated weights of that layer for successive processing on the next batch of data; wherein the step of generating the updated weights in each layer comprises using a modulation factor computed based on the number of processing stages between that layer and the output layer.

The modulation factor may be a function of the square root of n+1, where n is proportional to the number of processing stages between the present layer and the output layer. In one embodiment the modulation factor is the square root of n+1, where n is the number of processing stages between the present layer and the output layer.

The modulation factor may be applied to the estimate of the gradient computed at each layer.

The modulation factor may be applied to an estimate of velocity computed at each layer.

The modulation factor may be applied at each layer to the learning rate of the model.

The method may comprise processing sequential batches of data, wherein each processing stage processes a batch of data using the updated weights stored for that processing stage.

The updated weights for at least some batches of data may be stale relative to the layer in which that batch of data is being processed.

Computing the estimate of the gradient may comprise computing one or more partial derivative of the loss function with respect to one or more components of the input of each layer, and computing a function of the input of each layer and a partial derivative of the loss function with respect to the input of a subsequent layer. For a set of feed-forward layers, this function may be a product of the input and the partial derivative. For convolutional layers, this function may be a convolution operation between the input and the partial derivative.

The updated weights used to compute the estimate of the gradient on the backward pass of a batch of data may differ from the weights used to process the batch of data in the forward pass at that layer.

Computing the estimate of the gradient may comprise computing an average of the gradient of the loss function over the first batch of data.

Generating updated weights may comprise subtracting from the weights a modification term, the modification term comprising the product of the learning rate and a function of the estimated gradient. For example, the modification term for stochastic gradient descent may comprise a product of the learning rate and the estimated gradient, where the function of the estimated gradient is the identity function. Several other algorithms may be used which determine different functions of the estimated gradient to generate updated weights.

The method may comprise storing the estimated gradient for successive processing on one or more subsequent batches, wherein generating updated weights comprises forming a sum of the weights and a term comprising a product of the learning rate and a function of a weighted sum of estimated gradients from previously processed batches. For a stochastic gradient descent algorithm with weighted average, the sum is formed of the weights and a term comprising a product of the learning rate and a weighted sum of estimated gradients. Other algorithms may determine a different function of the weighted sum of gradients to generate updated weights.

According to another aspect of the present disclosure, there is provided a computer program embodied on computer-readable storage, the program comprising code configured so as when executed by one or more processors to perform the operations of the method as hereinabove described.

According to another aspect of the present disclosure, there is provided a computer comprising a plurality of pipelined processing stages, each stage providing one or more layers of a machine learning model and configured to carry out steps of processing batches of data comprising computing an output for the set of one or more layers by computing an activation function on the weighted inputs, determining an estimate of the gradient of a loss function for the set of layers with respect to the weights of those layers, updating the weights of the set of layers based on the determined estimate of the gradient for the set of layers using a learning rate stored in memory and a modulation factor dependent on the processing stage; and storing the updated weights for the set of layers.

The computer may comprise at least one processor and computer memory storing code executable by the at least one processor to perform the steps of processing batches of data and for storing the updated weights for the set of layers.

The present inventors have examined the problem of delays in applying asynchronous updates in a pipelined processing scheme using a concept of 'staleness'. They have noted that 'staleness' worsens for the earlier stages of the processing pipeline, where there are more intermediate steps between the application of weights to inputs of a given mini-batch in a forward pass and the calculation of the gradient for that same mini-batch and updating of weights in a backwards pass. Staleness may be defined in terms of the number of steps n between the forward computation of the output for a given mini-batch (F) and the application of the gradients (W) in a weight update for that mini-batch at the same processing node/layer.

For a better understanding of the present invention and to show how it may be carried into effect, reference will now be made by way of example to the accompanying drawings.

DETAILED DESCRIPTION OF EXEMPLARY EMBODIMENTS

Note that, in the following description, any reference to processing of a 'batch' of data may refer to a subset of training data, i.e. a mini-batch.

The following describes a modulated asynchronous update scheme for mini-batch training intended to offset the effect of stale gradients by modifying weight updates at different layers by a modulating factor. Note that references to gradients in this description refer to estimated gradients determined for the given mini-batch of data being processed.

Figure 3:
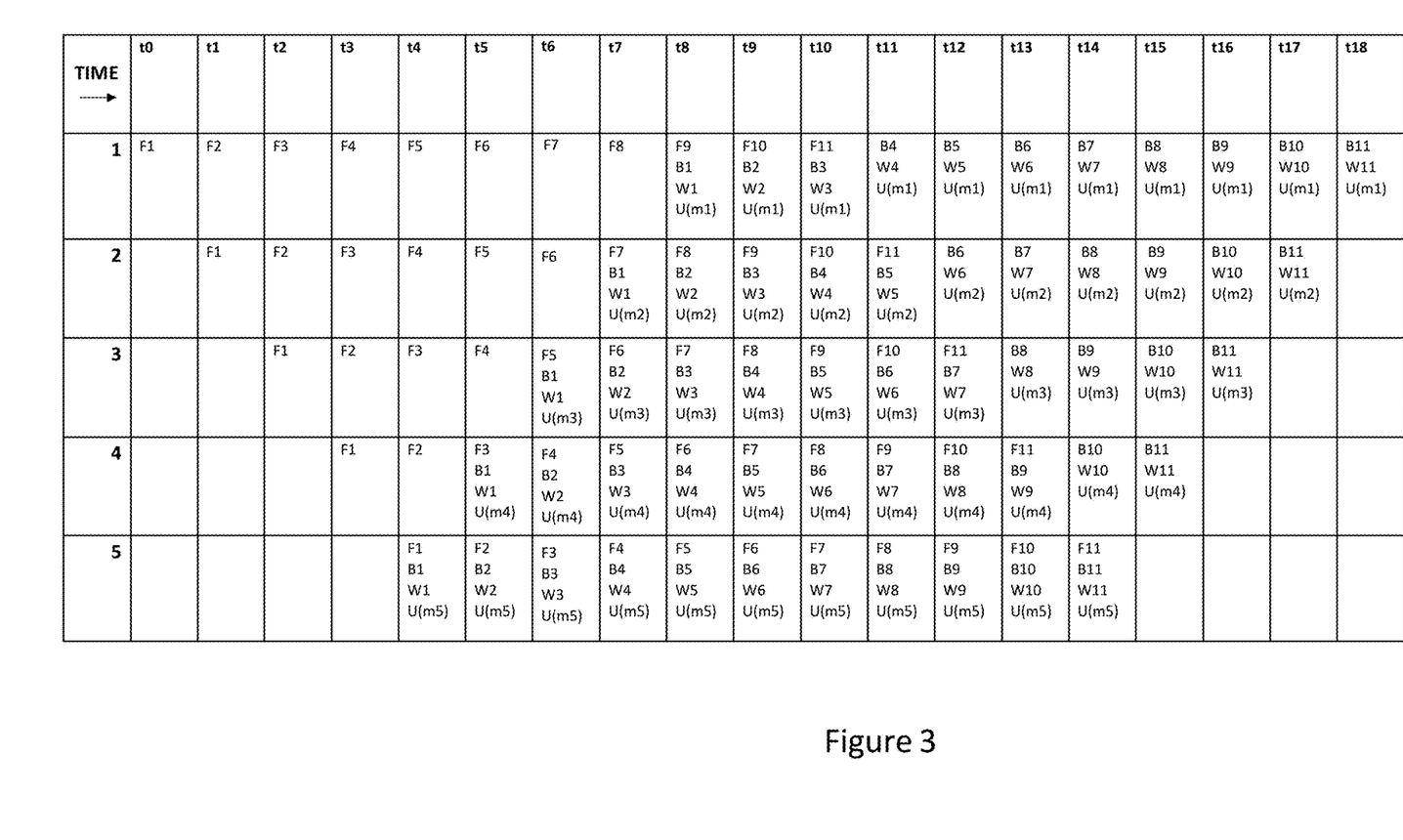
FIG. 3 is a block diagram showing pipelined processing of multiple mini-batches in training a machine learning model with modulated asynchronous updates.

FIG. 3 shows an example of a pipeline comprising five stages for asynchronous processing of a machine learning model comprising five layers by a set of five processing nodes. In this example, each node is configured to process a single layer of the network at a single stage of the pipeline, but in general a processing node may be configured to process more than one layer of a network, and nodes may be reused to process multiple pipeline stages. FIG. 3 shows the computations carried out at each stage of the pipeline for a set of timesteps t0418. Note that timesteps refer to a set of processing steps that occur in sequential order and do not necessarily represent fixed or uniform periods in time. FIG. 3 shows the processing pipeline for a training set comprising 11 mini-batches. Each mini-batch is denoted by a number 1-11. Mini-batch data is input to the neural network at the first layer at stage 1. At this layer, the input data is input to a function with the weights of layer 1 and an output value is produced and passed as an input to stage 2, at which node 2 is configured to process layer 2. For example, at timestep t0, mini-batch 1 is processed in a forward pass at layer 1 and an output F1 is passed to stage 2. In the next timestep, this data is processed to compute F1 at stage 2 and a second mini-batch is processed to compute F2 at stage 1.

When an output of the first mini-batch has been computed at the final layer, this output may be used to compute a loss function, which may be a measure of error between network output values and training target values for the model. The goal of the model is to output values close to the target data, which corresponds to minimising the loss function. To do this, weights are updated in the network such that the loss function is minimised. This may be achieved by applying a stochastic gradient descent update rule to the weights, updating the weights with a term proportional to the negative gradient of the loss function, which thus updates the weights in the direction of minimal loss. An example of a stochastic gradient descent update for a weight $\theta$ at a step k is as follows:

$$\theta_{k+1} = \theta_k - \eta \nabla_\theta L(\theta_k),$$

where $\nabla_\theta L(\theta_k)$ denotes the gradient of the loss function with respect to the weight $\theta$ and $\eta$ is the learning rate, which determines the size of each update. A large learning rate may lead to the weights fluctuating around, but not falling within an accepted range at a minimum, but a small learning rate may result in slow convergence. Note that while the value of the loss function itself may be calculated at the end of a forward pass, weight updates are computed using a gradient of the loss function and thus do not necessarily require the value of the loss to be calculated.

According to embodiments of the present invention, to address the problem of staleness in asynchronous weight updates, a modulation factor m is introduced into the weight update computation where m may differ for each processing node. A stochastic gradient descent update with modulation factor m may be written as $$\theta_{k+1} = \theta_k - m\eta \nabla_\theta L(\theta_k).$$

The gradient of the loss function with respect to the weights is calculated by the chain rule using the gradient of the loss function with respect to the outputs. Thus, at the final stage, the gradient with respect to the output is computed before computing the gradient with respect to the input (B) and the gradient with respect to the weights (W) for the layer or layers of the final stage. Then, a modulated weight update $-m_5 \eta \nabla_\theta L(\theta_k)$ is applied by node 5 at the final stage with a modulation factor $m_5$:

$$\theta_{k+1} = \theta_k + m_5 \eta \Delta(\theta_k)$$

where $\Delta(\theta_k) = -\nabla_\theta L(\theta_k)$. In FIG. 3, the modulated weight update is denoted as U(mi), where i is the pipeline stage, for example the modulated update at stage 5 $-m_5 \eta \nabla_\theta L(\theta_k)$ is denoted U(m5).

Updates are applied at each layer when gradients are calculated. For example, for mini-batch 1, the gradients B1 and W1 are computed and the update $m_5 \eta \Delta(\theta_k)$ is applied at t4. The gradient B1 is passed to layer 4 and used to calculate B1 and W1 at layer 4 and apply the update $m_4 \eta \Delta(\theta_k)$ to the weights at layer 4.

The delay between the calculation of outputs at each layer for a mini-batch in a forward pass and the application of weight updates calculated for that mini-batch, is considered to reflect a staleness of gradients and depends on the node in question. As shown in FIG. 3, at node 5, at timestep t4, computation of the outputs for mini-batch 1 at layer 5 and application of the weight updates $m_5 \eta \Delta(\theta_k)$ for that mini-batch at layer 5 is carried out in the same timestep. However, at node 4, timestep t5, it can be seen that while the first mini-batch was processed by node 4 at timestep t3, the update $m_4 \eta \Delta(\theta_k)$ to the weights for mini-batch 1 at layer 4 is only applied at timestep t5. This represents a delay of n=2.

Figure 4:
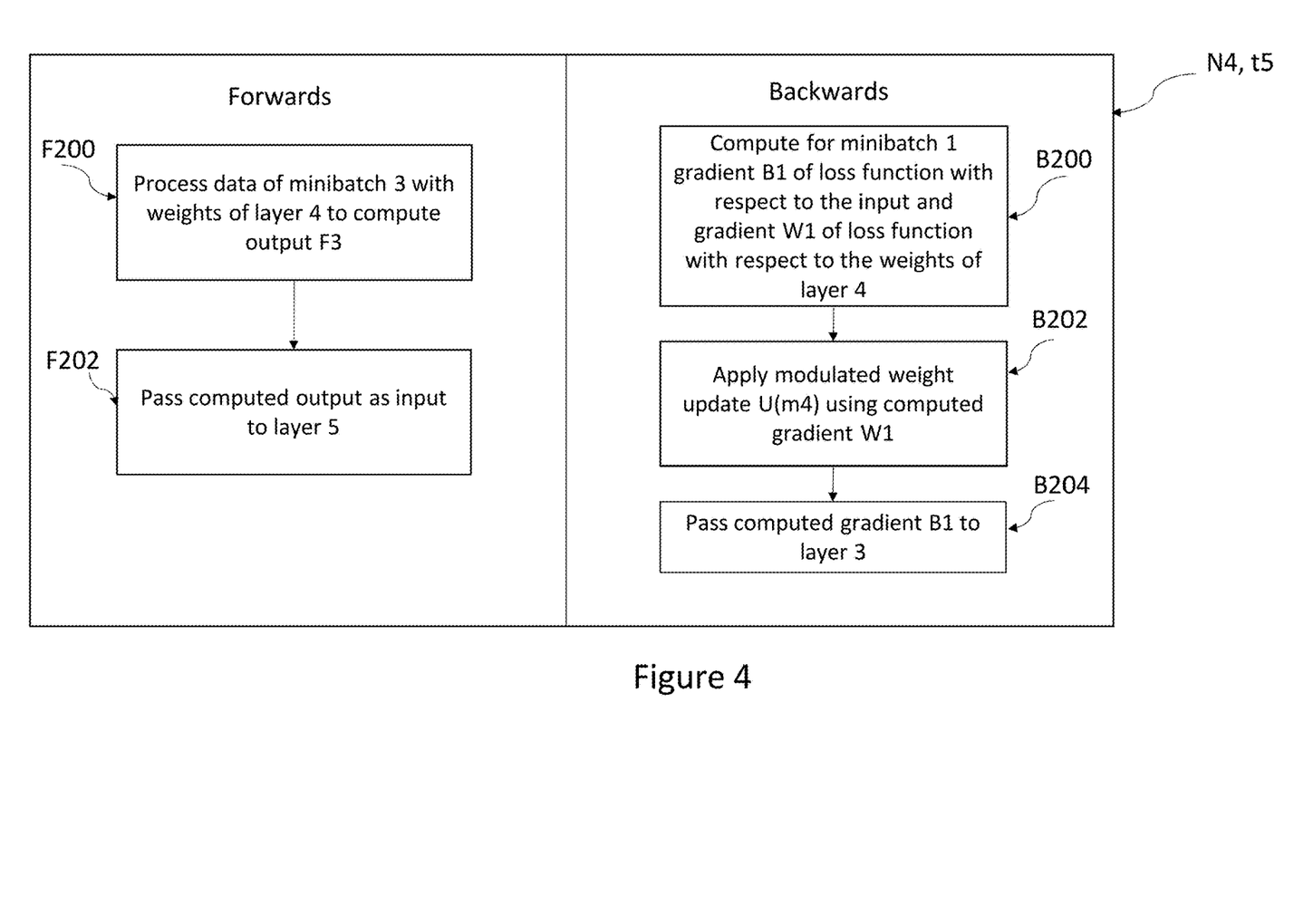
FIG. 4 shows the processing steps of an example processing node at a given timestep.

FIG. 4 shows the processing steps carried out by node 4 at pipeline stage 4 at timestep t5. Note that while this is described as multiple processing steps, all steps of FIG. 4 occur within a single timestep as defined herein. In the forward processing step, node 4 takes the inputs for mini-batch 3 from stage 3 and applies the current stage 4 weights to these inputs to generate a set of output values (step F200). The computed stage 4 output for mini-batch 3 is passed as input to stage 5 (step F202). In a backwards processing step, the gradients B1 and W1 are calculated for mini-batch 1 using the gradient B1 passed from stage 5 and the current weights at stage 4. A modulated update $m_4 \eta \Delta(\theta_k)$ is applied to the current weights of stage 4 (step B202). The computed gradient B1 for mini-batch 1 at stage 4 is passed to node 3 for computing the gradient at stage 3 (step B204). Weights at each layer are stored in memory on the processing node. This is described in more detail later, with reference to FIGS. 5 and 6.

The inventors have recognised that using a standard update scheme for the asynchronous updates shown in FIG. 3, where the update scheme is the same for every node, leads to noisy weight updates due to varying staleness levels at different pipeline stages. Applying a different modulation factor at each stage of the pipeline has the effect of mitigating the effect of the noisy updates at each node.

Embodiments of the present invention provide a modulation factor m applied to the gradient term of each update, where m depends on the staleness degree at each pipeline stage in such a way that the noise of the weight updates applied is independent of the staleness of the gradients at a given pipeline stage.

In one example embodiment, a standard stochastic gradient descent scheme is used for updates. In this case, the weights of the network may be updated according to the following modulated update rule:

$$\theta_{k+1} = \theta_k - m\eta \nabla_\theta L(\theta_k) \quad (1)$$

where $\theta_k$ are the model weights, $\nabla_\theta L(\theta_k)$ is the gradient of the loss function with respect to the weights averaged over a mini-batch of training examples and $\eta$ is the learning rate, which determines how fast the weights should move in the direction of the negative gradient. Typically, an initial value is chosen for the learning rate, which may be adjusted as the weights approach a local minimum of the loss function. The modulation factor m for this update rule is set at $$\frac{1}{\sqrt{n+1}}.$$

The difference between the parameters of a time step k and the next step k+1 is given by:

$$\epsilon_0 = \theta_{k+1} - \theta_k = -m\eta \nabla_\theta L(\theta_k) = m\eta \Delta(\theta_k),$$

where $\Delta(\theta_k) = -\nabla_\theta L(\theta_k)$.

The difference between parameters separated by two timesteps is given by:

$$\epsilon_1 = \theta_{k+1} - \theta_{k-1} = m\eta[\Delta(\theta_k) + \Delta(\theta_{k-1})],$$

And the difference between parameters separated by n+1 timesteps is given by:

$$\epsilon_n = \theta_{k+1} - \theta_{k-n} = m\eta[\Delta(\theta_k) + \Delta(\theta_{k-1}) + \ldots + \Delta(\theta_{k-n})].$$

As explained above, at a given pipeline stage in FIG. 4, there may be a delay of n steps between the forward calculation for a given mini-batch and the application of weight updates for that same mini-batch at that stage. The distance between weight updates between these two timesteps is a measure of the staleness of the layers at that stage, given by $\epsilon_n$ above.

To determine the effect of staleness on the variability or noise of updates, the gradient for a single parameter $\theta_i$ is modelled as a noisy variable: $\Delta(\theta_{ik}) = g_{ik} + \xi_k$, where $g_{ik}$ is the negative gradient in the i-th direction at time k, and with the expected value of the noise term being zero, and the expected value of $\xi_k^2$ being $\sigma^2$. This gives:

$$\mathbb{E}\{\xi_k\} = 0$$

$$\mathbb{E}\{\xi_k \xi_j\} = \sigma^2 \delta_{k,j}$$

$$\mathbb{E}\{\Delta(\theta_{ik})\} = g_k.$$

The variance of the weight update $\epsilon_0$ is thus given by:

$$\mathbb{E}\{\epsilon_0^2\} - \mathbb{E}^2\{\epsilon_0\} = m^2\eta^2\mathbb{E}\{\Delta^2(\theta_{ik})\} - m^2\eta^2\mathbb{E}^2\{\Delta(\theta_{ik})\} = m^2\eta^2[\mathbb{E}\{(g_{ik} + \xi_k)^2\} - g_{ik}^2] = m^2\eta^2\mathbb{E}\{\xi_k^2\} = m^2\eta^2\sigma^2.$$

For an update with staleness n, the variance is given by:

$$\mathbb{E}\{\epsilon_n^2\} - \mathbb{E}^2\{\epsilon_n\} = m^2\eta^2\mathbb{E}\{[\Delta(\theta_{ik}) + \Delta(\theta_{i(k-1)}) + \ldots + \Delta(\theta_{i(k-n)})]^2\} - m^2\eta^2\mathbb{E}^2\{\Delta(\theta_{ik}) + \Delta(\theta_{i(k-1)}) + \ldots + \Delta(\theta_{i(k-n)})\} = m^2\eta^2[g_{ik}^2 + g_{i(k-1)}^2 + \ldots + g_{i(k-n)}^2 + 2g_{ik}g_{i(k-1)} + \ldots + 2g_{ik}g_{i(k-n)} + \ldots + 2g_{i(k-1)}g_{i(k-2)} + \ldots + 2g_{i(k-1)}g_{i(k-n)} + \ldots + 2g_{i(k-n+1)}g_{i(k-n)} + (n+1)\sigma^2 - (g_{ik} + g_{i(k-1)} + \ldots + g_{i(k-n)})^2] = (n+1)\sigma^2\eta^2m^2.$$

The variance is thus directly proportional to n+1, where n is the delay between the use of weights in the forward pass and the computation of the update. However, the variance is also proportional to the square of the modulation factor.

Thus, applying the modulation factor $$m = \frac{1}{\sqrt{n+1}}$$

gives the variance of weight updates:

$$(n+1)\sigma^2\eta^2 m^2 = (n+1)\sigma^2\eta^2\left(\frac{1}{\sqrt{n+1}}\right)^2 = \sigma^2\eta^2.$$

Thus, for a modulation factor of $$\frac{1}{\sqrt{n+1}}$$

the variance of a weight update has no dependence on the degree of delay at the given pipeline stage.

A second example of an update rule is stochastic gradient descent with momentum. A filter may apply a modified update rule:

$$v_k = \alpha v_{k-1} - \nabla_\theta L(\theta_k) \quad (2a)$$

$$\theta_{k+1} = \theta_k + m\eta v_k \quad (2b)$$

where $v_k$ is the momentum velocity, and a is the momentum coefficient. At each update step, a term including the previous step's momentum velocity is added, which allows smoothing of the updates by incorporating multiple previous steps. The momentum coefficient determines how 'long' the filter is—i.e. how many previous gradients are taken into account for the current update. If $\alpha$ is close to 0, then the previous gradients decay rapidly, and the updates approach standard stochastic gradient descent (eq. 1). If a is close to 1, the previous gradients decay slowly and a large number of previous gradients are significant in the current update. The effect of taking previous steps into account is that updates are pushed more quickly in the current direction, which reduces fluctuations in weight updates and may lead to faster or more reliable convergence to a minimum of the loss function.

The modulation factor m which eliminates staleness dependence in this update scheme is:

$$m = \frac{1-\alpha}{\sqrt{\left(n+1 - \frac{2\alpha}{1-\alpha}(1-\alpha^{n+1}) + \frac{\alpha^2}{1-\alpha^2}(1-\alpha^{2(n+1)})\right)}}$$

A third example of an update rule is stochastic gradient descent with momentum with exponentially weighted average. This may use the following update rule:

$$v_k = \alpha v_{k-1} - (1-\alpha)\nabla_\theta L(\theta_k) \quad (3a)$$

$$\theta_{k+1} = \theta_k + m\eta v_k \quad (3b)$$

where $v_k$ is the momentum velocity, and $\alpha$ is the momentum coefficient. As with stochastic gradient descent with momentum, at each update step, a term including the previous step's momentum velocity is added, which allows smoothing of the updates by incorporating multiple previous steps and allows faster convergence to a minimum, depending on the chosen momentum coefficient $\alpha$.

The modulation factor m which eliminates staleness dependence for stochastic gradient descent with exponentially weighted average is:

$$m = \frac{1}{\sqrt{\left(n+1 - \frac{2\alpha}{1-\alpha}(1-\alpha^{n+1}) + \frac{\alpha^2}{1-\alpha^2}(1-\alpha^{2(n+1)})\right)}}$$

Figure 5:
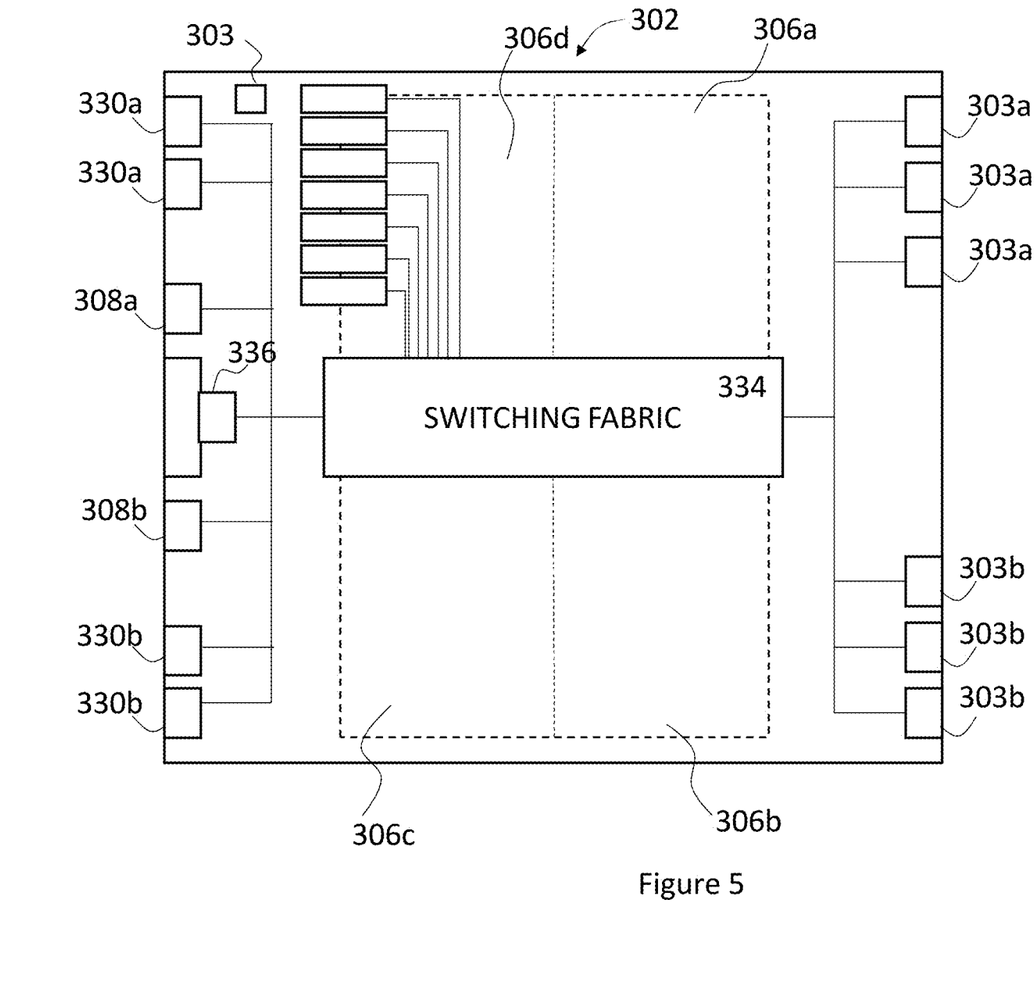
FIG. 5 is a schematic block diagram of a processing unit.

FIG. 5 illustrates schematically the architecture of a single chip processor 302, which may be used singly or connected to other processors as a processing node. In a computer, the single chip processors can be connected together using inter-chip links on the chip. The processor 302 comprises multiple processing units referred to as tiles arranged on a single chip. In one embodiment, there are 1216 tiles organised in arrays 306a, 306b, 306c, and 306d. The processor 302 has two chip-to-host links 308a, 308b and 4 chip-to-chip links 330a, 330b arranged on an edge of the chip. The processor 302 receives work from a host (not shown) which is connected to the chip via one of the card-to-host links in the form of input data to be processed by the chip 302. The chips can be connected together into cards by a further chip-to-chip links 330a, 330b. The host may access a computer which is architected as a single chip processor 302 as described herein or a group of multiple interconnected single chip processors 302 depending on the workload from the host application.

When the processor is executing a machine learning or other complex or graph based application, vectors or tensors to be processed, for example inputs to a given layer, are provided to the processor from the host as workloads to be processed. Where vectors are small enough, a single vector may be processed by a single respective tile. It is more common for vectors in ML applications to be extremely large. In that case they may be broken up into fragments, and each fragment processed by an individual tile. Results of the processing are provided by each tile and may be combined at the same tile or other tiles, or supplied to the host for combining.

The chip 302 has a clock generator 303 which generates a clock signal from an on or off chip clock to control the timing of chip activity. The clock generator is connected to all of the chip's circuits and components. The chip 302 comprises a switching fabric 334 to which all tiles and links are connected by sets of connection wires to enable communication between tiles on the processor. Each tile has its own local memory. The tiles do not share memory.

Figure 6:
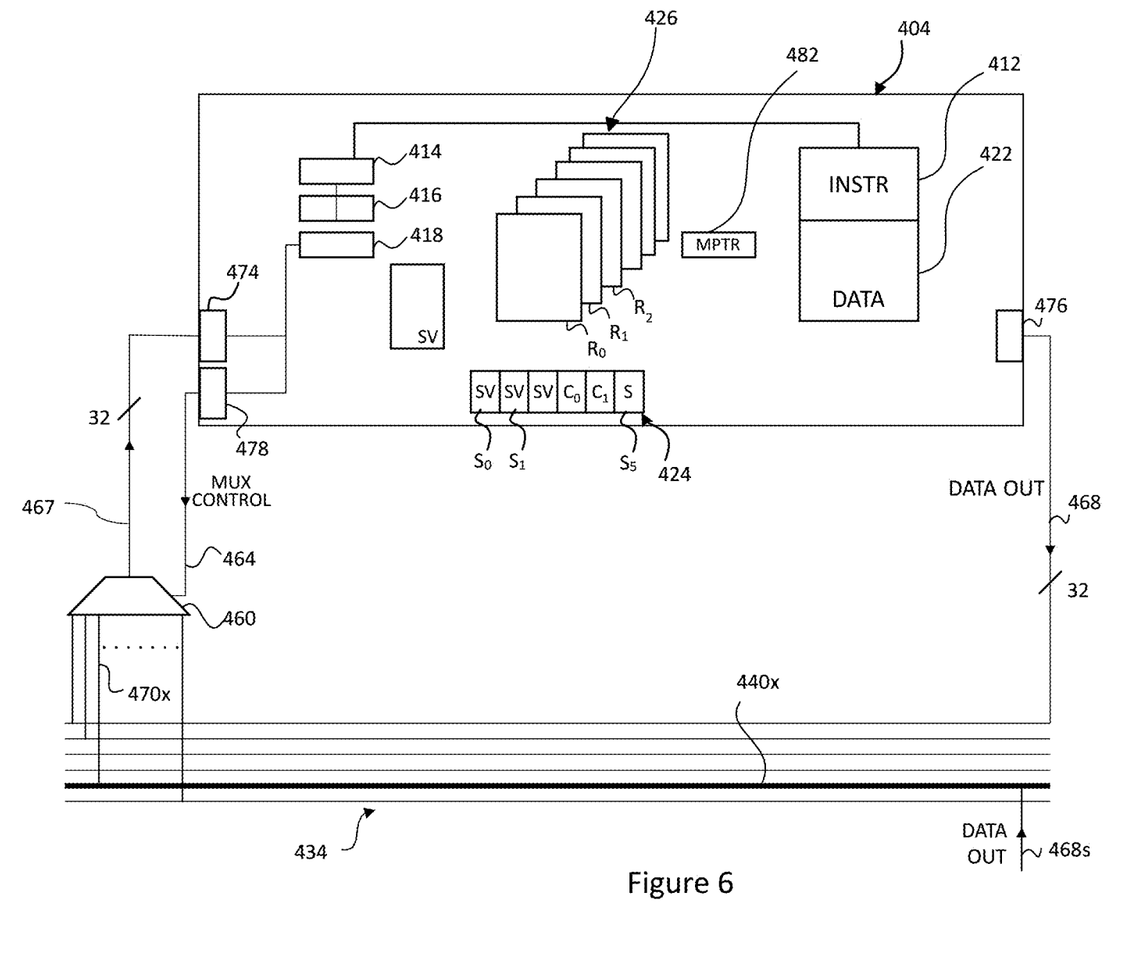
FIG. 6 is a schematic block diagram of a tile processor.

FIG. 6 illustrates an example tile 404 in accordance with embodiments of the present disclosure. In the tile, multiple threads of execution are interleaved through a single execution pipeline. In some embodiments, each thread may process a vector or vector fragment in accordance with pre-compiled instructions stored on the tile in an instruction memory 412. The tile 404 comprises: a plurality of contexts 426 each arranged to represent the state of a different respective one of a plurality of threads; the shared instruction memory 412, which is common to the plurality of threads on that tile, but not shared by other tiles; a shared data memory 422 that is also common to the plurality of threads; a shared execution pipeline 414, 416, 418 that is again common to the plurality of threads; and a thread scheduler 424 for scheduling the plurality of threads for execution through the shared pipeline in an interleaved manner.

The data memory holds data supplied to the tile for processing, for example vector values of a whole vector or fragment of a vector, and results of that processing. For example, in the context of a forward pass as described in FIG. 4, the tile memory may hold fragments of an input vector in addition to the weights to be applied to the input data and may then store the resulting output data.

The thread scheduler 424 is schematically represented in the diagram by a sequence of time slots S0 . . . S5, but in practice is a hardware mechanism managing program counters of the threads in relation to their time slots. The execution pipeline comprises a fetch stage 414, a decode stage 416, and an execution stage 418 comprising an execution unit (EXU) and a load/store unit (LSU). Each of the contexts 426 comprises a respective set of registers R0, R1 . . . for representing the program state of the respective thread.

The fetch stage 414 is connected to fetch instructions to be executed from the instruction memory 412, under control of the thread scheduler 424. The thread scheduler 424 is configured to control the fetch stage 414 to fetch instructions from the local program for execution in each time slot.

Note that in normal operation the program loaded into each tile is determined by a processor or compiler to allocate work based on the computation graph of the machine intelligence model being supported. This computation graph defines what code (executable instructions) is stored and executed on each tile. Data (inputs and outputs) may be exchanged between tiles and or the host.

Figure 7:
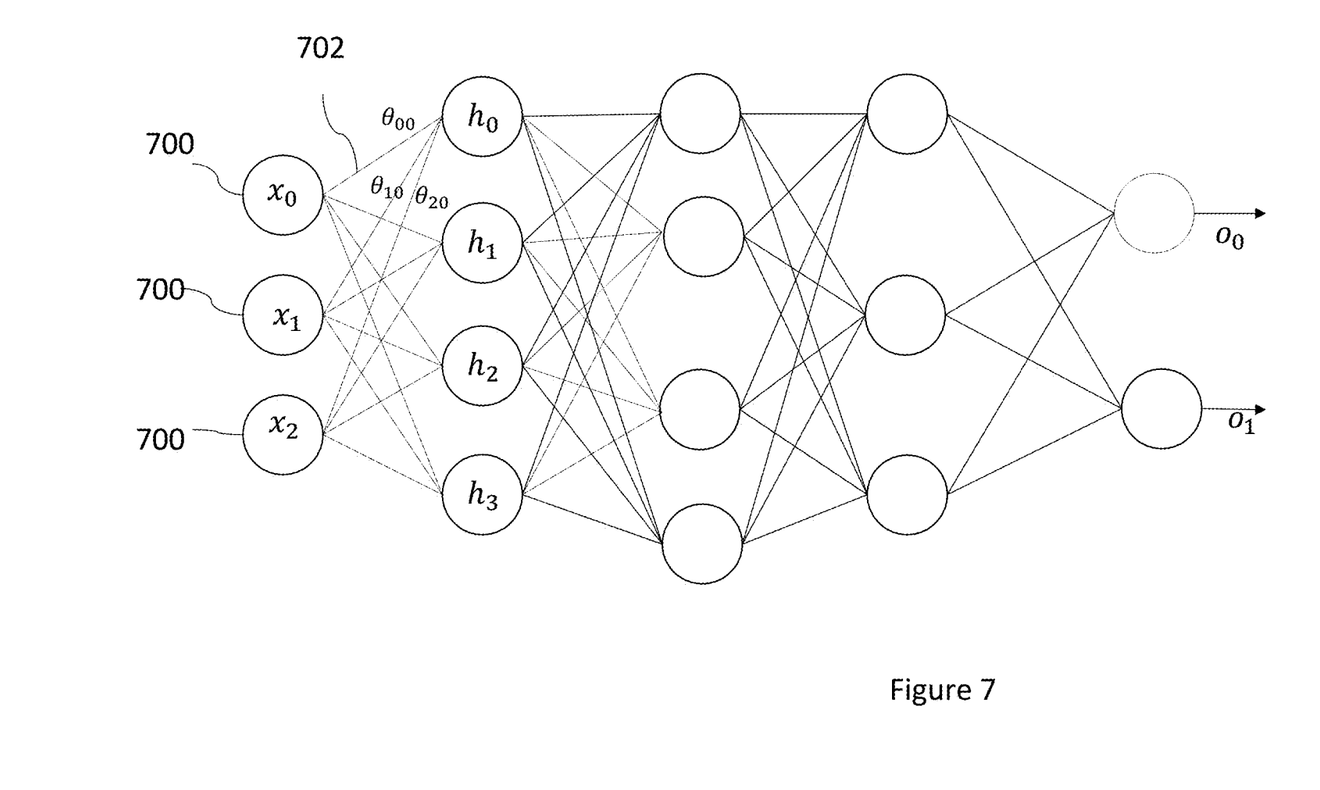
FIG. 7 is a schematic diagram showing an example of a multi-layer neural network.

FIG. 7 shows a simplified example of a set of feed-forward layers of a multi-layer neural network which may be trained according to embodiments described herein, comprising nodes 700 arranged in a set of five layers. A feed forward neural network may comprise an input vector x, processed at one or more 'hidden' layers, and an output layer. The training input may be processed before being passed to the layers of the neural network, for example, the input data may be embedded to a vector space of a predefined dimension. Each layer includes a linear operation and an activation function on a set of inputs which may be in vector form, and produces an output vector to be passed to a subsequent layer. Each node typically multiplies each input value by a corresponding weight $\theta_{ij}$ defined in FIG. 7 as the respective links 702 between node i of the first layer and node j of the second layer before applying a nonlinear activation function $f$. For example, as shown in FIG. 7, the following function is computed at node 0 of hidden layer 1:

$$f(\theta_{00}x_0+\theta_{10}x_1+\theta_{20}x_2)$$

In general, there are a large number of inputs at each layer, and the vector of weighted sums to be processed at the first hidden layer may be computed as a matrix operation:

$$h_i = f(W_i^T x_i),$$

where $h_i$ is defined as the output vector of hidden layer i, $W_i$ is the matrix of weights for hidden layer i, $x_i$ is the vector of inputs to hidden layer i, and $f$ is a nonlinear activation function.

An example of a nonlinear activation function that may be applied at a given layer is a logistic sigmoid function $\sigma(x)=1/(1+e^{-x})$, to produce an output value at the given node. For example, for the first hidden layer of FIG. 7, a logistic sigmoid activation function may be applied to the weighted inputs to compute an output vector $h_i$ for hidden layer i with components:

$$h_{i,j} = \frac{1}{1+e^{-(W_i^T x_i)_j}}$$

An alternative commonly used activation function is the rectified linear unit function $ReLU(x)=\max(0,x)$, corresponding to an output vector $h_i$ with components:

$$h_{i,j} = \max(0,(W_i^T x_i)_j)$$

This output is passed to the next consecutive layer, where processing typically includes the computation of a further linear projection W and activation function $f$.

The output of the final feed-forward layer may be further processed to obtain a suitable output value. For example, if the goal of the network is to predict a set of probabilities, for example to classify a training example into one of a set of classes, the outputs may be normalised to a value between zero and one by applying a softmax function. Neural network architectures may also in practice combine feed forward networks such as the simple example described above with other mechanisms such as attention, dropout and normalisation. Normalisation may be applied at multiple points in the neural network architecture, and comprises scaling and shifting vectors to a predefined mean and variance. Attention is a function computed as a weighted sum of a set of values, with the weights determined by a function of a query and a corresponding key. The queries, keys and values used to compute attention depend on the network and training goal. For example, attention may be used in a decoder of an encoder-decoder architecture, with the queries coming from a previous layer of the decoder and the keys and values coming from the output of the encoder. An example of an architecture which combines normalisation, attention, and feed-forward layers in an encoder-decoder architecture is described in A. Vaswani et al., "Attention Is All You Need', arXiv:1706.03762v5, 2017.

Figure 8:
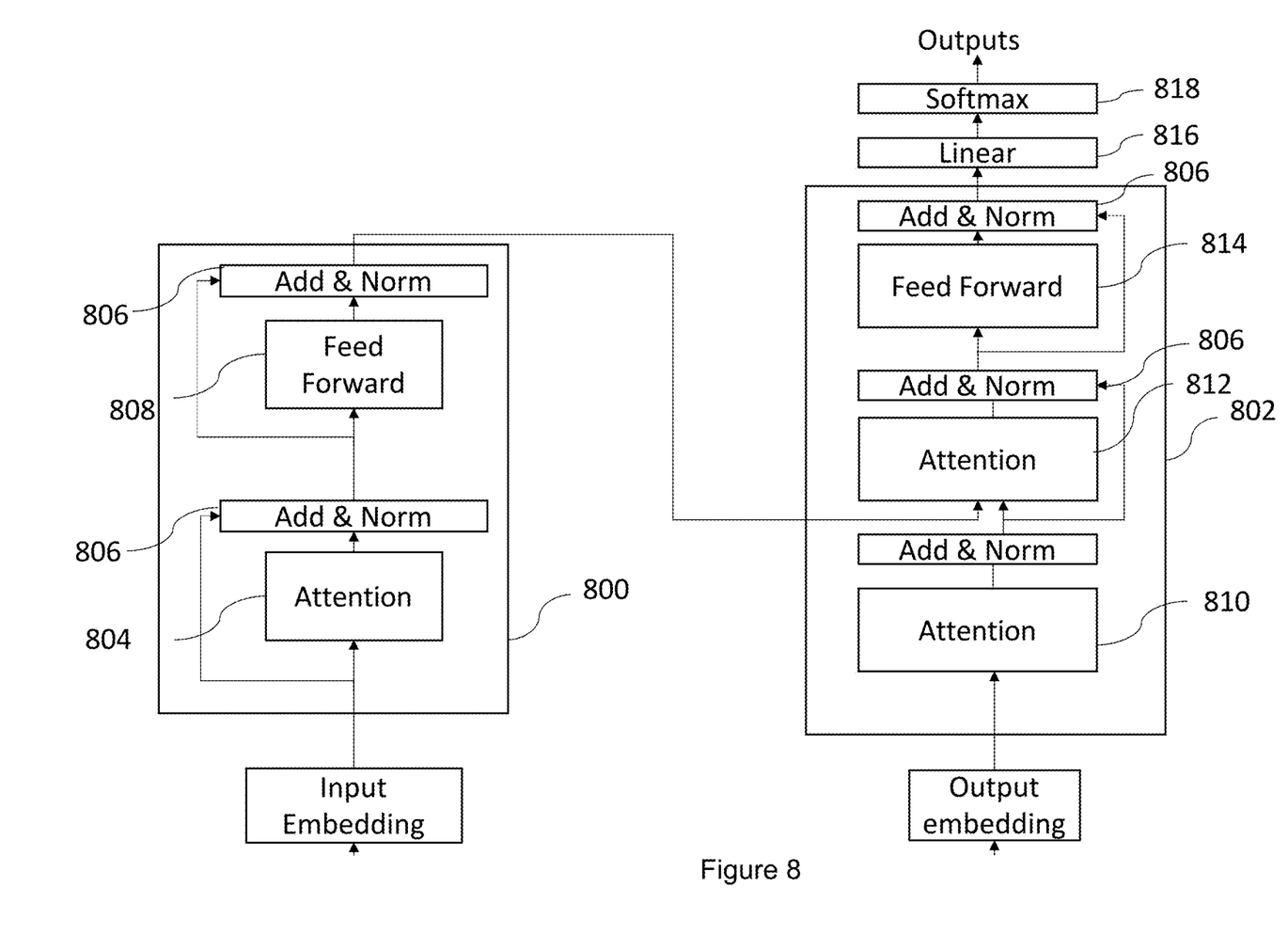
FIG. 8 shows an example of a machine learning architecture which may be trained according to the described methods.

FIG. 8 shows a representative example of an architecture that may be trained according to the methods outlined above, which is similar to that described in A. Vaswani et al., referenced above. This architecture is suited to sequence-to-sequence tasks such as machine translation. An encoder component 800 comprises multiple layers, where each layer comprises an attention block 804 and a feed-forward block 808, each followed by a residual connection and normalisation function 806, which adds the output of the respective component to its input before applying a normalisation function to the sum, as shown in FIG. 8, with one connection directed to the sum and normalisation function 806 from the previous component, and a second connection around the component, which may be referred to as a residual connection. A decoder component 802 comprises multiple layers, where each layer comprises a first attention block 810 and a second attention block 812, the first of which performs self-attention on the decoder layer input, and the second of which performs attention on keys and values from the output of one encoder layer 800 and queries from the previous decoder layer. The decoder layer 802 also comprises a feedforward block 814. Each of the attention and feedforward blocks are followed by a normalisation function 806, as in the encoder. Finally, the output of the decoder may be acted upon by a linear projection 816 and/or a softmax function 818 or some other appropriate function to obtain a network output of a suitable form.

Gradient descent may be used to train such a network, wherein a loss function, is defined based on the final outputs and a set of target values associated with the training inputs. In this case, gradients of this loss function may be computed with respect to the activations of the network and propagated backwards through the network, from the output layer to the input. At each layer, the gradient of the loss function with respect to the layer output is used to compute the gradient of the loss with respect to the layer input and the gradient of the loss with respect to the weights. At each layer, the weights of the network are updated according to a predefined update rule, such as the examples described above, using the computed gradients. As disclosed above, processing of the neural network may be carried out in a pipelined parallel fashion, making use of multiple processing nodes, each of which may be configured to process one or more layers of the network. The inputs, weights, and computed outputs and gradients may be held in data memory on each processing node.

The invention claimed is:

1. A method of processing batches of data in a computer comprising a plurality of pipelined processing stages each providing one or more layers of a machine learning model, the method comprising:

processing a first batch of data in the pipelined processing stages in a forward pass, each layer using an activation function and weights for that layer to generate an output activation, wherein the output activation provides an input for a next layer of the model, and wherein an output layer generates an output of the model;

comparing the output of the model with a target value in accordance with a loss function to provide an estimate of a gradient;

processing the estimate of the gradient in a backwards pass of the model, each layer computing an estimate of the gradient for that layer with respect to the weights for that layer;

generating updated weights in each layer, the updated weights resulting from processing the estimate of the gradient with respect to the weights for the first batch at that layer in the backwards pass, using a learning rate for the model; and storing the updated weights of that layer for successive processing on the next batch of data;

wherein the step of generating the updated weights in each layer comprises using a modulation factor computed based on a number of the processing stages between that layer and the output layer, wherein the modulation factor is a function of a square root of a function of n+1, where n is proportional to the number of the processing stages between a present layer and the output layer.

2. The method of claim 1 wherein the modulation factor is a function of the square root of n+1.

3. The method of claim 1 comprising applying the modulation factor to the estimate of the gradient computed at each layer.

4. The method of claim 1 comprising applying the modulation factor to an estimate of velocity computed at each layer.

5. The method of claim 1 comprising applying the modulation factor at each layer to the learning rate of the model.

6. The method of claim 1 comprising processing sequential batches of data, wherein each processing stage processes a batch of data using the updated weights stored for that processing stage.

7. The method of claim 6 wherein the updated weights for at least some batches of data are stale relative to the layer in which that batch of data is being processed.

8. The method of claim 1 wherein computing the estimate of the gradient comprises:
computing one or more partial derivatives of the loss function with respect to one or more components of an input of each layer, and
computing a function of the input of each layer and the partial derivative of the loss function with respect to the input of a subsequent layer.

9. The method of claim 1 wherein the updated weights used to compute the estimate of the gradient on the backward pass of a batch of data differ from the weights used to process the batch of data in the forward pass at that layer.

10. The method of claim 1, wherein computing the estimate of the gradient comprises computing an average of the gradient of the loss function over the first batch of data.

11. The method of claim 1, wherein generating updated weights comprises subtracting from the weights a modification term, the modification term comprising a product of the learning rate and a function of the estimated gradient.

12. The method of claim 1, comprising storing the estimated gradient for successive processing on one or more subsequent batches, wherein generating updated weights comprises forming a sum of the weights and a term comprising a product of the learning rate and a function of a weighted sum of estimated gradients from previously processed batches.

13. A computer comprising a plurality of pipelined processing stages a first one of the pipelined processing stages providing one or more layers of a set of layers of a machine learning model, the first pipelined processing stage configured to process data according to a method comprising:
computing an output activation for each of the one or more layers by computing an activation function on a set of weighted inputs, the weighted inputs being generated by applying weights to a set of inputs of each of the one or more layers;
determining an estimate of a gradient of a loss function for each layer of the one or more layers with respect to a respective set of weights for a given one of the layers;
updating the weights of the one or more layers based on the estimate of the gradients using a learning rate stored in memory and a modulation factor associated with the first pipelined processing stage; and
storing the weights for each of the one or more layer after the updating,
wherein the modulation factor is computed based on a number of the pipelined processing stages between a given layer and an output layer of the set of layers,
wherein the modulation factor is a function of a square root of a function of n+1, where n is proportional to the number of the processing stages between a present layer and the output layer.

14. The computer of claim 13 comprising at least one processor and computer memory storing code executable by the at least one processor to process the data and for storing the weight.

15. A computer program product embodied on non transitory computer-readable storage and comprising code configured so as when executed by a computer having a plurality of pipelined processing stages, a first one of the pipelined processing stages providing one or more layers of a set of layers of a machine learning model, wherein the code causes the computer to perform a method comprising:
computing an output activation for each of the one or more layers by computing an activation function on a set of weighted inputs, the weighted inputs being generated by applying weights to a set of inputs of each of the one or more layers;
determining an estimate of a gradient of a loss function for each layer of the one or more layers with respect to a respective set of weights for a given one of the layers;
updating the weights of the one or more layers based on the estimate of the gradients using a learning rate stored in memory and a modulation factor associated with the first pipelined processing stage; and
storing the weights for each of the one or more layer after the updating,
wherein the modulation factor is computed based on a number of the pipelined processing stages between a given layer and an output layer of the set of layers,
wherein the modulation factor is a function of a square root of a function of n+1, where n is proportional to the number of the processing stages between a present layer and the output layer.

16. The computer program product of claim 15, further comprising code to cause the computer to apply the modulation factor to the estimate of the gradient computed at each of the one or more layers.

17. The computer program product of claim 15, further comprising code to cause the computer to apply the modulation factor to an estimate of velocity computed at each layer of the one or more layers.

18. The computer program product of claim 15, further comprising code to cause the computer to apply the modulation factor at each layer of the one or more layers to the learning rate of the model.

* * * * *